United States Patent [19]
Nohira et al.

[11] Patent Number: 4,892,675
[45] Date of Patent: Jan. 9, 1990

[54] OPTICALLY ACTIVE POLYMER AND LIQUID CRYSTAL COMPOSITION CONTAINING SAME

[75] Inventors: Hiroyuki Nohira, Urawa; Kazutaka Arai, Yotsukaidou; Kazuo Yoshinaga, Machida, all of Japan

[73] Assignees: Canon Kabushiki Kaisha; Nissan Chemical Industries, Ltd., both of Tokyo, Japan

[21] Appl. No.: 203,132

[22] Filed: Jun. 7, 1988

[30] Foreign Application Priority Data

Jun. 10, 1987 [JP] Japan ............... 62-143177
May 17, 1988 [JP] Japan ............... 63-118330

[51] Int. Cl.$^4$ ............ C09K 19/52; C09K 19/12; C08G 63/02
[52] U.S. Cl. ............ 252/299.01; 252/299.66; 528/272; 528/308; 528/331
[58] Field of Search ......... 252/299.01, 299.6, 299.66, 252/299.65; 528/271, 272, 308, 331

[56] References Cited

U.S. PATENT DOCUMENTS

2,470,651  5/1949  Schaffel .
4,622,165 11/1986  Kano ............... 252/299.65

FOREIGN PATENT DOCUMENTS

0122204 10/1984  European Pat. Off. .
0168043  1/1986  European Pat. Off. .
0970969  9/1964  United Kingdom .

OTHER PUBLICATIONS

Polymer Bulletin, vol. 9, No. 6/7 (1983) 336:43.
Proceedings of the Int'l Conf. on Liquid Crystal Polymers, Jul. 20-24, 1987 in Mol. Cryst. Liq. Cryst. 155, 1988.
Proc. Sixth Int'l Symp. on Liquid Crystals and Ordered Fluids, Aug. 31-Sep. 4, 1987, in Mol. Cryst. Liq. Cryst. 157, 1988.
Polymer Liquid Crystals, A. Ciferri, ed., Academic Press, New York, 1982.

*Primary Examiner*—Teddy S. Gron
*Assistant Examiner*—Richard Treanor
*Attorney, Agent, or Firm*—Fitzpatrick, Cella, Harper & Scinto

[57] ABSTRACT

An optically active polymer comprises recurring units of the following formula:

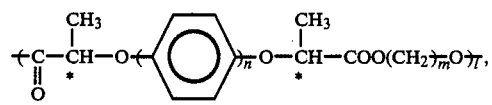

wherein l is an integer of 5–1000, n is an integer of 1–3, m is an integer of 2–20, and * denotes the location of an asymmetric center. The optically active polymer has a good mutual solubility with a low-molecular weight mesomorphic compound and is easily mixed with the latter to provide a uniform liquid crystal composition which shows ferroelectricity and better film formability and stability than the low-molecular weight mesamorphic compound alone.

12 Claims, No Drawings

OPTICALLY ACTIVE POLYMER AND LIQUID CRYSTAL COMPOSITION CONTAINING SAME

FIELD OF THE INVENTION AND RELATED ART

The present invention relates to a novel optically active polymer having an optically active group in its polymer (main) chain and a liquid crystal composition containing the polymer.

The polymer or the liquid crystal composition containing the polymer of the present invention can be used as a material for optoelectronics represented by liquid crystal devices, a material for optical instructions, a material for optical resolution, etc.

There has been a well known type of liquid crystal devices using TN (twisted nematic) type liquid crystals as shown, for example, in "Voltage-Dependent Optical Activity of a Twisted Nematic Liquid Crystal" by M. Schadt and W. Helfrich, Applied Physics Letters, Vol. 18, No. 4 (Feb. 15, 1971), pp. 127–128. In this type of liquid crystal devices, the number of picture elements have been restricted, because there is a problem that a crosstalk phenomenon occurs when a device of a matrix electrode structure with a high density of picture elements is driven according to a multiplexing driving scheme. Further, their uses for display have been limited because of slow electric field response and poor visual angle characteristics.

As another type of liquid crystal device, there has been known one comprising a plurality of picture elements each connected to and subject to switching by a thin film transistor as a switching element. This type of liquid crystal device, however, is accompanied with problems such that production of thin film transistors on a substrate is very complicated, and production of a display device with a large picture area or screen is difficult.

In order to obviate the above-mentioned drawbacks of the conventional types of liquid crystal devices, Clark and Lagerwall have proposed the use of a liquid crystal device showing a bistability (e.g., U.S. Pat. No. 4,367,924). As the bistable liquid crystal, a ferroelectric crystal showing a chiral smectic C phase (SmC*) or H phase (SmH*) is generally used.

Such a ferroelectric liquid crystal has very rapid response speed on account of having spontaneous polarization, can also exhibit memorizable bistable state and further have excellent vision angle characteristic, and therefore it is considered to be suitable for a display of large capacity and large picture area. In actual production of a liquid crystal cell, however, it is difficult to develop a monodomain over a wide area, thus providing a technical problem in producing a display device of a large area.

In order to produce a display device of a large area easily, it is considered suitable to use a polymeric liquid crystal. As an example of a liquid crystal display system using a polymeric liquid crystal, it is possible to raise a polymeric liquid crystal display device of a thermal writing-type as disclosed in Polymer Communications, Vol. 24, p.p. 364–365, "Thermotropic Liquid Crystalline Polymers 14" by V. Shibaev, S. Kostromin, N. Pláte, S. Ivanov, V. Vestrov and I. Yakovlev.

The above-described system, however, involves several problems such as poor contrast because of the use of light scattering for readout and a delay in response accompanying the use of a polymeric liquid crystal, so that it has not been put to practical use.

SUMMARY OF THE INVENTION

An object of the present invention is to provide a material for solving the above-mentioned problems of conventional liquid crystal materials.

Another object of the present invention is to provide a liquid crystal composition solving the above-mentioned problems and particularly providing both a good response speed and a device of a large area.

More specifically, according to a first aspect of the present invention, there is provided an optically active polymer having recurring units of the following formula (I):

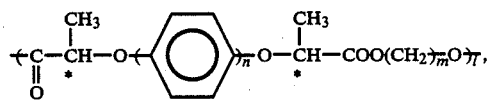

wherein $l$ is an integer of 5–1000, n is an integer of 1–3, m is an integer of 2–20, and * denotes the location of an assymetric center.

According to a second aspect of the present invention, there is provided a liquid crystal composition comprising the above-mentioned optically active polymer and a low-molecular weight mesomorphic compound.

The above mentioned and other objects and features of the invention will be better understood upon consideration of the following detailed description concluding with specific examples of practice.

DETAILED DESCRIPTION OF THE PREFERRED EMBODIMENTS

The above-mentioned optically active polymer having recurring units of the formula (I) (hereinafter indicated as "polymer (I)") may be produced through an ordinary process for polyester synthesis, for example, in the following manner.

An acid halide of the following formula (II):

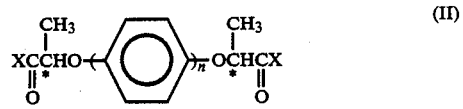

(wherein X is a halogen atom, n is an integer of 1–3, and * denotes the location of an asymmetric center), and a diol of the following formula (III):

(wherein m is an integer of 2–20) are subjected to an esterification of the de-hydrogen halide type.

The reaction scheme thereof is shown below.

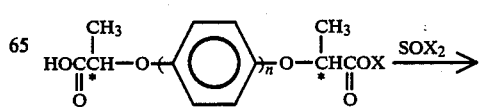

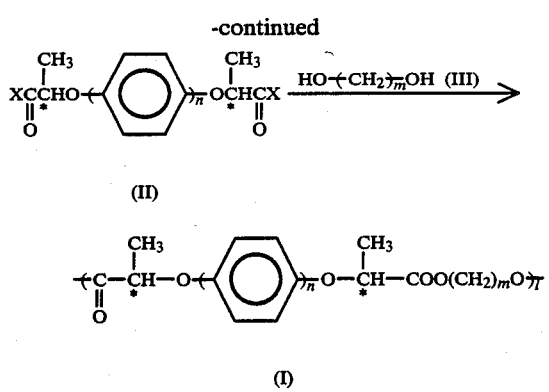

In the above scheme, l, n, m and * have the same meanings as defined above.

The acid halide (II) used in the above reaction may be produced through halogenation of a corresponding di-carboxylic acid. In view of the availability, an acid chloride and an acid bromide are preferred, among which an acid chloride is particularly preferred when the easiness of the reaction operation, etc., are taken into consideration. The number n in the acid halide (II) is generally 1–3 and preferably 1–2.

The number m in the diol (III) used in the above reaction is 2 to 20 but may preferably be 2 to 12 particularly 2–10, in view of the availability.

The above reaction can proceed in the absence of a solvent but can also be effected in the presence of a solvent not participating in the reaction, e.g., an aromatic hydrocarbon type solvent such as benzene or toluene, a halogen-containing solvent such as orthodichlorobenzene, and others. Such solvents may be used singly or in mixture of several species in an amount of 20 or less times the total weight of the acid halide (II) and the diol (III), preferably 5 or less times in view of the volume efficiency, polymerization efficiency, etc.

The reaction is effected at a mol ratio of the acid halide (II)/the diol (III) of around 1.0. The polymerization efficiency is increased as the mol ratio approaches 1.0. The mol ratio in the range of 0.7–1.3 may generally be used. The reaction can proceed even in the absence of a base if the system is heated. As it is possible that the optical activity is lost in case where a base is used, a weak basicity is preferred. The reaction can proceed at a temperature on the order of 20° C., but the system is generally heated to 50° C. to 200° C. for promotion of the reaction. According to necessity, it is possible to add a base, to increase the temperature or to further add the acid halide (II) or the diol (III) in the course of the reaction.

The polymer (I) obtained through the above reaction is subject to the intended use after ordinary post treatment or through further purification by chromatography.

The polymer (I) according to the present invention may preferably have a weight-average molecular weight (Mw) of $2 \times 10^3$ to $5 \times 10^5$, more preferably $4 \times 10^3$ to $2 \times 10^5$, in respect of the stabilization of performances as a polymer.

Further, the average number of the recurring units represented by the formula (I) may desirably be 5 to 1000, more preferably be 10 to 400, in view of the above-mentioned stabilization of performances as a polymer.

The liquid crystal composition of the present invetion comprises the above-mentioned polymer and a low-molecular weight or non-polymeric mesomorphic compound. The low-molecular weight mesomorphic compound may be selected from a wide scope of known mesomorphic compounds without particular restriction as far as it has a good mutual solubility with the polymer. More specifically, the low-molecular weight mesomorphic compound may be one having one mesogen unit or two mesogen units showing cholesteric phase or smectic phase but more preferably one showing chiral smectic phase. The low-molecular weight mesomorphic compound may be used singly or in mixture of two or more species.

Specific examples of the low-molecular weight mesomorphic compound mixed with the polymer may include known compounds represented by the formulas (1)–(17): which are shown below together with phase transition characteristics. Herein, the respective symbols denote the following phases:

| | |
|---|---|
| Cryst. | crystal, |
| SmC* | chiral smectic C phase, |
| SmH* | chiral smectic H phase, |
| SmA | smectic A phase, |
| SmB | smectic B phase, |
| Sm3 | un-identified smectic phase, |
| Ch. | cholesteric phase, |
| N | nematic phase, |
| Iso. | isotropic phase. |

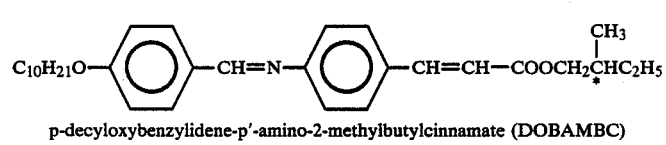

p-decyloxybenzylidene-p'-amino-2-methylbutylcinnamate (DOBAMBC)

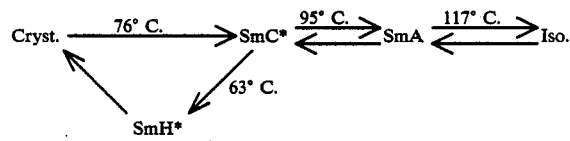

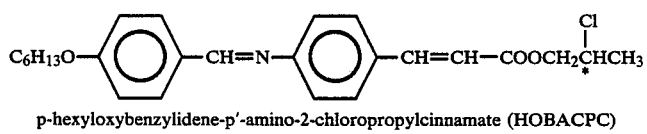

p-hexyloxybenzylidene-p'-amino-2-chloropropylcinnamate (HOBACPC)

Cryst. ⇌ $\xrightarrow{60°C.}$ SmH* ⇌ $\xrightarrow{64°C.}$ SmC* ⇌ $\xrightarrow{78°C.}$ SmA ⇌ Iso.

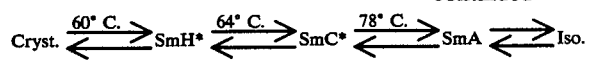

p-decyloxybenzylidene-p'-amino-2-methylbutyl-α-cyanocinnamate (DOBAMBCC)    (3)

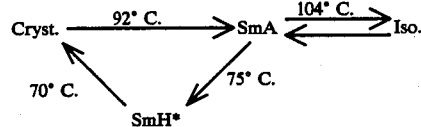

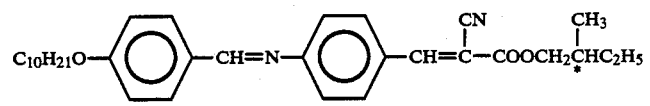

p-tetradecyloxybenzylidene-p'-amino-2-methylbutyl-α-cyanocinnamate (TDOBAMBCC)    (4)

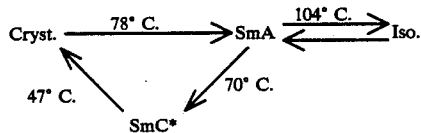

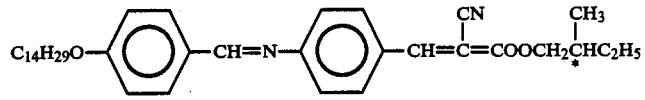

p-octyloxybenzylidene-p'-amino-2-methylbutyl-α-chlorocinnamate (OOBAMBCC)    (5)

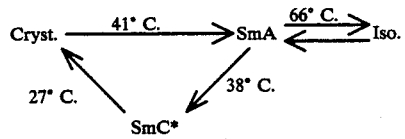

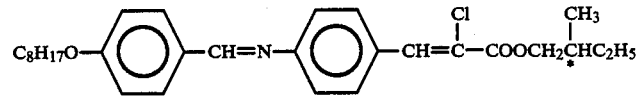

p-octyloxybenzylidene-p'-amino-2-methylbutyl-α-methylcinnamate    (6)

Cryst. ⇌ $\xrightarrow{49°C.}$ SmC* ⇌ $\xrightarrow{58°C.}$ SmA ⇌ $\xrightarrow{94°C.}$ Iso.

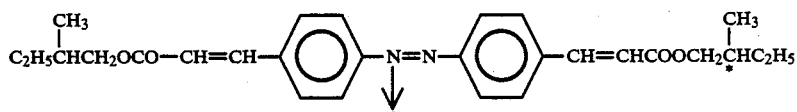

4,4'-azoxycinnamic acid-bis(2-methylbutyl)ester    (7)

Cryst. ⇌ $\xrightarrow{121°C.}$ SmC* ⇌ $\xrightarrow{134°C.}$ SmA ⇌ $\xrightarrow{168°C.}$ Iso.

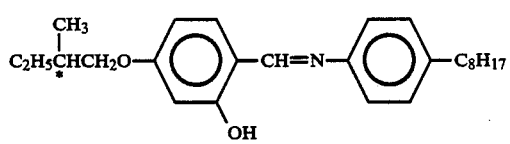

4-O—(2-methylbutyl)resorcylidene-4'-octylaniline (MBRA 8)    (8)

Cryst. ⇌ $\xrightarrow{28°C.}$ SmC* ⇌ $\xrightarrow{55°C.}$ SmA ⇌ $\xrightarrow{62°C.}$ Iso.

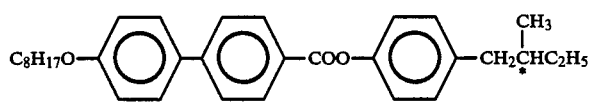

4-(2'-methylbutyl)phenyl-4'-octyloxybiphenyl-4-carboxylate    (9)

-continued

Cryst. ⇌ 78° C. Sm3 ⇌ 80° C. SmC* ⇌ 128.3° C. SmA ⇌ 171.0° C. Ch. ⇌ 174.2° C. Iso.

(10)

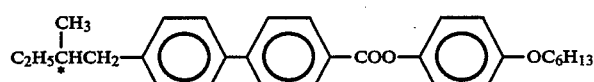
4-hexyloxyphenyl-4-(2''-methylbutyl)biphenyl-4'-carboxylate

Cryst. ⇌ 68.8° C. SmC* ⇌ 80.2° C. Ch. ⇌ 163.5° C. Iso.

(11)

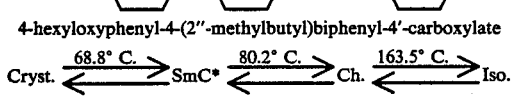
4-octyloxyphenyl-4-(2''-methylbutyl)biphenyl-4'-carboxylate

Cryst. ⇌ 76° C. SmC* ⇌ 88.6° C. Ch. ⇌ 155.4° C. Iso.

(12)

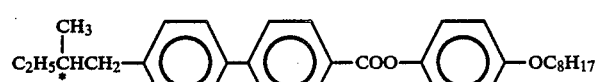
4-heptylphenyl-4-(4''-methylhexyl)biphenyl-4'-carboxylate

Cryst. ⇌ 91.5° C. SmC* ⇌ 93° C. SmA ⇌ 112° C. Ch. ⇌ 131° C. Iso.

(13)

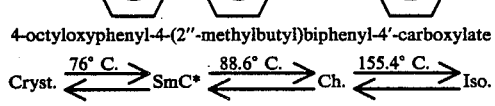
4-(2''-methylbutyl)phenyl-4-(4''-methylhexyl)biphenyl-4'-carboxylate

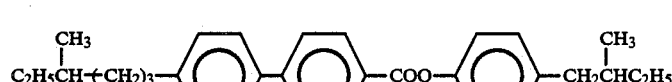

(14)

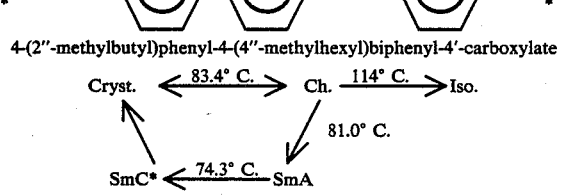
4-(2''-methylbutyl)phenyl-4-(4''-methylhexyl)biphenyl-4'-carboxylate

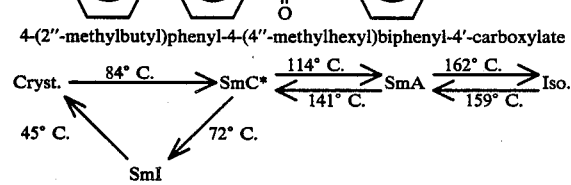

(15)

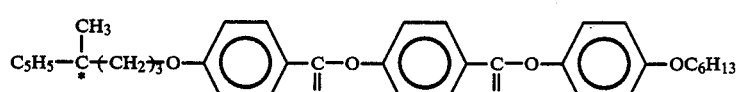
(4'-(4-hexyloxy)phenyloxycarbonyl)phenyl-p-(4''-methylhexyloxy)benzoate Cryst. ⇌ 95.6° C. / 72.4° C. SmC* ⇌ 115° C. / 108° C. Ch. ⇌ 187° C. / 183° C. Iso.

(16)

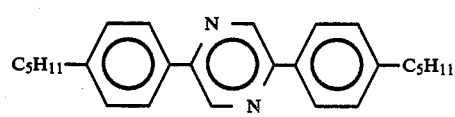
2,5-di(4'-pentylphenyl)pyrazine

Cryst. → 134° C. SmC → 174° C. SmA → 182° C. N → 191° C. Iso.

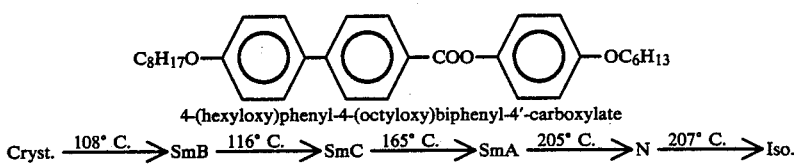

4-(hexyloxy)phenyl-4-(octyloxy)biphenyl-4'-carboxylate

Cryst. $\xrightarrow{108°\text{ C.}}$ SmB $\xrightarrow{116°\text{ C.}}$ SmC $\xrightarrow{165°\text{ C.}}$ SmA $\xrightarrow{205°\text{ C.}}$ N $\xrightarrow{207°\text{ C.}}$ Iso.

The liquid crystal composition may contain generally 10–90 wt. %, preferably 10–85 wt. %, of the polymer. Less than 1 wt. % fails to provide a sufficient sharpability, strength and film-formability, and more than 90 wt. % leads to excessively long time required for injecting the composition into the liquid crystal device.

On the other hand, the low-molecular weight mesomorphic compound may be contained in the liquid crystal composition in a proportion of generally 10–99 wt. %, preferably 15–90 wt. %.

In the liquid crystal composition of the present invention, it is possible to add a colorant, a photo-stabilizer, a plasticizer, a light absorbent, etc.

Hereinbelow, the present invention will be explained more specifically with reference to examples.

EXAMPLE 1

Production of polymer (A) (n=1, m=4 in the formula (I))

5.0 ml of thionyl chloride was added to 1.00 g of (+)-(2R, 2'R)-(1,4-phenylenebisoxy)bispropionic acid ($[\alpha]_D^{20}+93.6°$ (c=1.2, acetone)) and the mixture was subjected to 2 hours of heat refluxing, followed by removal of excessive thionyl chloride under reduced pressure to obtain the corresponding acid chloride in the form of pale yellow oil. To the acid chloride was added 0.35 g (equal molar amount) of 1,4-butanediol, and the mixture was heated under stirring for 1.5 hours at 80° C. and then for 1.5 hours at 120° C. Then, 60 ml of toluene was added, and the resultant mixture was washed with water, with 5% aqueous solution of sodium bicarbonate and then twice with water, followed by drying on anhydrous sodium sulfate and condensation under a reduced pressure to obtain a crude product of the polymer (A) (n=1, m=4). The product was purified by silica gel column chromatography (hexane-ethyl acetate to obtain 0.74 g of purified polymer (A) in the form of a substantially colorless glassy substance.

$[\alpha]_D^{25}+57.6°$; (c=1.09, ethyl acetate).

GPC data:
Mw (weight-average molecular weight)=$1.25 \times 10^4$
Mn (number-average molecular weight)=$0.6 \times 10^4$
Mz (Z-average molecular weight)=$2.5 \times 10^4$

EXAMPLES 2–5

Example 1 was repeated except that the 1,4-butanediol was replaced by an equal molar amount of 1,6-hexanediol (Example 2), 1,8-octanediol (Example 3), 1,10-decanediol (Example 4) and 1,7-heptanediol (Example 5) and the polymerization conditions were modified as shown in the following Table 1. The yields and the physical properties of the product polymers are also shown in Table 1.

TABLE 1

| Example | n | m | Polymerization conditions | Yield and Physical properties of polymers |
|---|---|---|---|---|
| 2 | 1 | 6 | 2 hours at 80° C. 1 hour at 100° C. Addition of 6 ml of toluene, followed by 3 hours of heat refluxing | Yield: 1.07 g, Pale yellow glassy substance $[\alpha]_D^{25}+95.0°$(c = 0.76, ethyl acetate) GPC data: Mw = $2.5 \times 10^4$, Mn = $0.3 \times 10^4$ Mz = $5.2 \times 10^4$ |
| 3 | 1 | 8 | 10 min at 80° C., 1 hour at 120° C., Addition of 6 ml of toluene, followed by 3 hours of heat refluxing | Yield: 1.33 g, Pale yellow glassy substance $[\alpha]_D^{25}+95.6°$(c = 0.84 ethyl acetate) GPC data: Mw = $6.8 \times 10^4$ Mn = $2.6 \times 10^4$ Mz = $11.9 \times 10^4$ |
| 4 | 1 | 10 | Addition of 7 ml of toluene, followed by reaction for 2 hours at 80° C. and 4 hours of heat refluxing | Yield: 1.29 g, Almost colorless glassy substance $[\alpha]_D^{25}+79.6°$(c = 0.32, ethyl acetate) GPC data: Mw = $5.4 \times 10^4$ Mn = $1.2 \times 10^4$ Mw = $11.0 \times 10^4$ |
| 5 | 1 | 7 | 3 hours at 100° C. 4 hours at 140° C. | Yield: 1.15 g, Almost colorless glassy substance $[\alpha]_D^{25}+78.7°$(c = 1.16, ethyl acetate) GPC data: Mw = $2.8 \times 10^4$ Mn = $0.8 \times 10^4$ Mz = $5.6 \times 10^4$ |

EXAMPLE 6

Production of polymer (B) (n=2, m=10 in the formula (I))

5.0 ml of thionyl chloride was added to 1.74 g of (+)-(2R, 2'R)-(4,4'-biphenylenebisoxy)bispropionic acid ($[\alpha]_D^{25}+65.6°$ (c=1.0, ethanol)) and the mixture was subjected to 2 hours of heat refluxing, followed by removal of excessive thionyl chloride under reduced pressure to obtain the corresponding acid chloride in the form of a pale yellow crystal. To the acid chloride were added 0.92 g (equal molar amount) of 1,10-decanediol and 2.0 ml of toluene, and the mixture was heated under stirring for 2.0 hours at 100° C. and then for 1.5 hours at 140° C. while the toluene was distilled off. Then, 50 ml of ethyl acetate was added, and the resultant mixture was washed with water, with 5% aqueous solution of sodium bicarbonate and then twice with water, followed by drying on anhydrous sodium sulfate and condensation under a reduced pressure to obtain a crude product of the polymer (B) (n=2, m=10). The product was purified by silica gel column chromatography (hexane-ethyl acetate to obtain 2.28 g of purified polymer (A) in the form of a slightly brownish glassy substance.

$[\alpha]_D^{25}+56.3°$; (c=0.43, ethyl acetate).

GPC data:
Mw=$1.2 \times 10^4$.
Mn=$0.3 \times 10^4$.
Mz=$2.2 \times 10^4$.

EXAMPLE 7

The polymer (A) obtained in Example 1 and the low-molecular weight mesomorphic compound (15) described hereinbefore were mixed at various weight ratios for a mutual solubility test, whereby the same phases as those of the mesomorphic compound (15) alone were observed over a wide compositional range. The phase transition temperatures of various compositional ratios of the mixture are shown in the following Table 2.

TABLE 2

| Ratio (A)/(15) | Temp. (°C.) Cryst. → SmC* → Ch. → Iso. | | |
| --- | --- | --- | --- |
| 0/1 | 95.6 | 115.0 | 187 |
| 1/9 | 93.9 | 112.0 | 183 |
| 1/4 | 93.7 | 111 | 182 |
| 1/1 | 92.7 | 109 | 182 |

EXAMPLE 8

Some of the liquid crystal compositions shown in Example 7 in isotropic phase were each injected into a blank cell which has been prepared by affixing a pair of glass substrates each provided with ITO transparent electrodes covered with a rubbed polyimide alignment film with a gap of 17 microns therebetween, whereby several liquid crystal cells were prepared. The liquid crystal cooled into SmC* phase in each cell was supplied with an electric field of 4 V/micron, whereby inversion of molecules in response to the electric field was observed. The measured values of the response time are shown in the following Table 3.

TABLE 3

| Ratio (A)/(15) | Temperature (°C.) | Response time (msec) |
| --- | --- | --- |
| 1/4 | 80 | 5.60 |
| | 90 | 3.52 |
| | 110 | 2.32 |
| | 120 | 2.20 |
| 1/1 | 80 | 7.50 |
| | 90 | 6.20 |

EXAMPLE 9

The polymer (A) obtained in Example 1 and the low-molecular weight ferroelectric mesomorphic compound (14) described hereinbefore were mixed at various weight ratios for a mutual solubility test similarly as in Example 7, whereby the same phases as those of the mesomorphic compound (14) alone were observed over a wide compositional range. The phase transition temperatures of various compositional ratios of the mixture are shown in the Table 4 below.

The values of the response time under the electric field of 4 V/microns measured in the same manner as in Example 8 by using these mixtures are shown in Table 5 below.

TABLE 4

| Ratio (A)/(14) | Temp. (°C.) Cryst. → SmC* → Ch. → Iso. | | |
| --- | --- | --- | --- |
| 0/1 | 84 | 144 | 162 |
| 1/9 | 82 | 140 | 159 |
| 1/4 | 80 | 136 | 153 |
| 1/1 | 74 | 134 | 150 |

TABLE 5

| Ratio (A)/(14) | Temperature (°C.) | Response time (μsec) |
| --- | --- | --- |
| 1/4 | 80 | 67.6 |
| | 90 | 45.3 |
| | 110 | 23.3 |
| | 120 | 19.0 |
| 1/1 | 80 | 76.0 |
| | 90 | 41.4 |

According to the present invention, the following advantageous effects are achieved.

(1) The optically active polymer according to the present invention has a very good mutual solubility with a low-molecular weight mesomorphic compound to provide a uniform liquid crystal composition.

(2) The liquid crystal composition according to the present invention comprising the optically active polymer and a low-molecular weight mesomorphic compound shows ferroelectricity and shows a switching effect when supplied with an electric field in its chiral smectic phase.

(3) A liquid crystal device of a large area is easily produced by the present invention.

(4) The polymer and its mixture with a low-molecular weight mesomorphic compound can provide a fast response speed so that an improved liquid crystal device can be provided. Further, these materials can be used as a material for other utilization such as in the field of optoelectronics, optical devices, optical resolution, etc.

What is claimed is:

1. An optically active polymer comprising recurring units of the following formula (I):

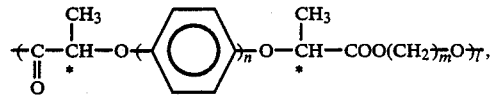

wherein l is an integer of 5–1000, n is an integer of 1–3, m is an integer of 2–20, and * denotes the location of an asymmetric center.

2. A polymer according to claim 1, wherein n is an integer of 1–2 and m is an integer of 2–10.

3. A polymer according to claim 1, wherein n is 1 and m is 4 in the formula (I).

4. A polymer according to claim 1, wherein n is 1 and m is 6 in the formula (I).

5. A polymer according to claim 1, wherein n is 1 and m is 8 in the formula (I).

6. A polymer according to claim 1, wherein n is 1 and m is 10 in the formula (I).

7. A polymer according to claim 1, wherein n is 1 and m is 7 in the formula (I).

8. A polymer according to claim 1, wherein n is 2 and m is 10 in the formula (I).

9. A liquid crystal composition, comprising: said optically active polymer of claim 1 and a non polymeric mesomorphic compound.

10. A composition according to claim 9, which shows ferroelectric properties.

11. A composition according to claim 9, wherein said non polymeric mesomorphic compound shows a smectic phase.

12. A composition according to claim 11, wherein said non polymeric mesomorphic compound shows chiral smectic phase.

* * * * *

UNITED STATES PATENT AND TRADEMARK OFFICE
CERTIFICATE OF CORRECTION

PATENT NO. : 4,892,675
DATED : January 9, 1990
INVENTOR(S) : HIROYUKI NOHIRA ET AL.

It is certified that error appears in the above-identified patent and that said Letters Patent is hereby corrected as shown below: ON TITLE PAGE:

AT [57] ABSTRACT

Line 10, "mesa-" should read --meso---.

COLUMN 2

Line 65, "$\begin{array}{c}CH_3\\|\\CHCOX\\*\phantom{x}\|\\\phantom{xx}O\end{array}$" should read --$\begin{array}{c}CH_3\\|\\CHCOH\\*\phantom{x}\|\\\phantom{xx}O\end{array}$--.

COLUMN 7

Form (15), "$C_5H_5$" should read --$C_2H_5$--.

COLUMN 12

Line 58, "non polymeric" should read --non-polymeric--.
Line 63, "non polymeric" should read --non-polymeric--.
Line 66, "non polymeric" should read --non-polymeric--.

Signed and Sealed this

Twenty-second Day of October, 1991

*Attest:*

HARRY F. MANBECK, JR.

*Attesting Officer*     *Commissioner of Patents and Trademarks*